H. R. LOTZ.
HEADLIGHT.
APPLICATION FILED JAN. 6, 1920.

1,400,366. Patented Dec. 13, 1921.

WITNESSES
Bernard Aebly
J. L. McAuliffe

INVENTOR
H. R. LOTZ.
BY Munn & Co
ATTORNEYS.

UNITED STATES PATENT OFFICE.

HAROLD RICHARD LOTZ, OF TOLEDO, OHIO.

HEADLIGHT.

1,400,366. Specification of Letters Patent. Patented Dec. 13, 1921.

Application filed January 6, 1920. Serial No. 349,764.

*To all whom it may concern:*

Be it known that I, HAROLD R. LOTZ, a citizen of the United States, and a resident of Toledo, in the county of Lucas and State of Ohio, have invented a new and Improved Headlight, of which the following is a description.

My invention relates to headlights for automobiles and more particularly adapted to be manually turned to throw the light rays to a side of the road. The invention resides in a novel post for supporting the headlight to be turned, the post being distinctive in the particulars hereinafter described and claimed.

Reference is to be had to the accompanying drawings forming a part of this specification, it being understood that the drawings are merely illustrative of one example of the invention.

Figure 1:
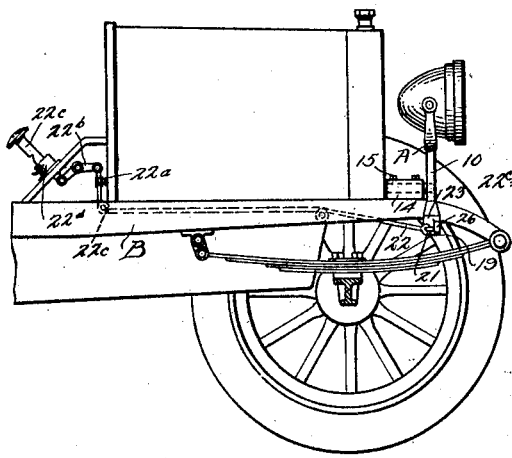
Figure 1 is a side elevation showing a headlight with my invention embodied therein mounted on an automobile shown in part.
Figure 2:
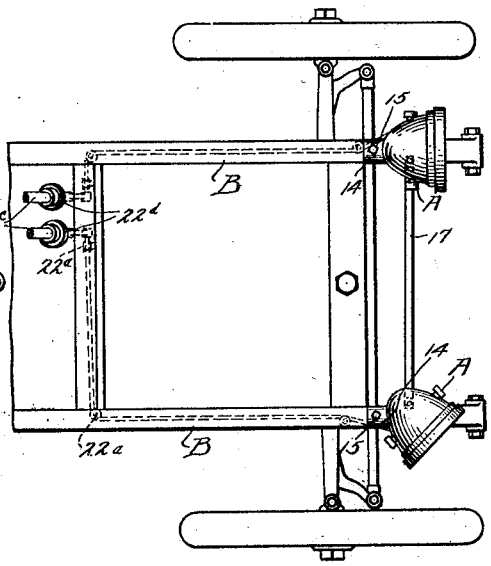
Fig. 2 is a plan view of the front portion of an automobile equipped with headlights embodying my invention.
Figure 3:
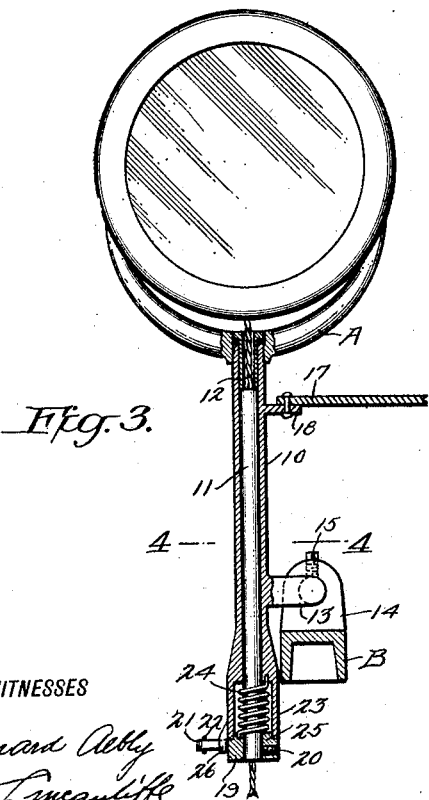
Fig. 3 is a vertical section of my improved post with a headlight in position thereon.
Figure 4:
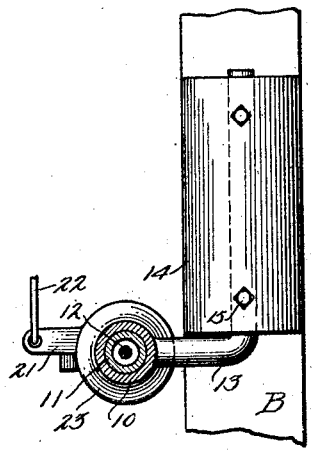
Fig. 4 is a horizontal section on the line 4—4, Fig. 3.

In carrying out my invention in practice the post is formed with a tubular body 10 in which is an inner tube 11 fitting snugly therein and adapted to be turned, a lamp bracket A being suitably mounted on the upper end of said tube, the conductor cord 12 in the case of an electric light passing through said inner tube.

Suitable means is provided to fixedly secure the body 10 to the automobile, the present example of the invention including an L-shaped arm 13 rigid with the body and adapted to be received in a socket 14 provided on the side bar B of the automobile when the latter is of the general construction indicated, set screws 15 serving to hold said L-arm 13 tightly in the socket. Also, if desired, the bodies 10 of the pair of lamps may have lugs 18 thereon adapted to be connected by a tie bar 17 to steady the posts.

The lower end of the inner tube 11 below the tubular body 10 is provided with a collar 19 secured by set screws 20 or the like and having a lateral arm 21 adapted to receive a cord 22 to be operated in any suitable manner by the driver. In the form shown the cord runs over pulleys 22$^a$ and connects with one arm of the bellcrank 22$^b$, the other arm of which is connected with a foot plunger 22$^c$ operating in a tubular guide 22$^d$.

The lower end 23 of the tubular body 10 is enlarged and counter-bored to provide a chamber accommodating a torsion spring 24 secured at one end to the collar 19 and at its other end to the body 10 for restoring the inner tube 11 carrying the lamp after turning movement thereof toward the roadside.

The collar 19 forms a closure for the counter-bored enlarged lower end of the tubular body 10 and presents at its upper end a boss 25 which fits said counter-bore, the arrangement serving to exclude dust and complete the housing of the spring 24 in the enlarged end 23 of the body. To limit the turning of the collar, 19, and tube 11 by spring 24, a fixed stop 26 is provided on the fixed housing 10 and extending downwardly into the path of arm 21.

The described form and arrangement of the parts results in a strong construction of simple elements, and prevents rattling of the parts, including rattling of the inner tube.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claim.

Having thus described my invention, I claim:

A post for headlights, including a tubular body having an enlarged lower end formed with a counter-bore, an inner element extending through and turnable in said body and adapted to support a lamp bracket, a collar on said inner element at the lower end presenting a post fitting said counter-bore, a torsion spring surrounding said inner element in said counter-bore and connected at its ends respectively with said body and said collar, an arm on said collar adapted to be connected with operating means, and a stop on said body to limit the turning of said arm.

HAROLD RICHARD LOTZ.